United States Patent
Arnold et al.

(10) Patent No.: US 11,876,379 B2
(45) Date of Patent: Jan. 16, 2024

(54) METHOD OF SYNCHRONIZING A GENERATOR WITH A POWER SUPPLY NETWORK

(71) Applicant: INNIO Jenbacher GmbH & Co OG, Jenbach (AT)

(72) Inventors: Georg Arnold, Innsbruck (AT); Simon Schmidt, Jenbach (AT); Tobias Triendl, Rinn (AT); Andreas Birgel, Innsbruck (AT)

(73) Assignee: Innio Jenbacher GmbH & Co OG, Jenbach (AT)

( * ) Notice: Subject to any disclaimer, the term of this patent is extended or adjusted under 35 U.S.C. 154(b) by 0 days.

(21) Appl. No.: 17/687,472

(22) Filed: Mar. 4, 2022

(65) Prior Publication Data

US 2022/0294230 A1     Sep. 15, 2022

(30) Foreign Application Priority Data

Mar. 8, 2021  (DE) .................... 10 2021 105 547.4

(51) Int. Cl.
*H02J 3/44*     (2006.01)
*F02D 29/06*   (2006.01)
(Continued)

(52) U.S. Cl.
CPC ............... *H02J 3/44* (2013.01); *F02D 29/06* (2013.01); *F02D 41/0002* (2013.01); *F02P 5/15* (2013.01); *H02J 2203/10* (2020.01)

(58) Field of Classification Search
CPC ...... F02D 2250/22; F02D 29/06; F02D 37/02; F02D 41/0002; F02D 41/021;
(Continued)

(56) References Cited

U.S. PATENT DOCUMENTS 5,497,741 A  *  3/1996  Tashiro ................... F02D 29/06
                                                            123/192.1
9,382,855 B2 *  7/2016  Fahringer ............... H02P 9/102
(Continued)

FOREIGN PATENT DOCUMENTS

AT             509558 A1      9/2011
DE      102017124709 B3     12/2018
(Continued)

OTHER PUBLICATIONS

European Extended Search Report for Application No. EP22159341.1 ; dated Aug. 9, 2022; 10 pages.
(Continued)

*Primary Examiner* — Carl C Staubach
(74) *Attorney, Agent, or Firm* — Fletcher Yoder, P.C.

(57) ABSTRACT

A method including:
mechanically driving a generator with an internal combustion engine, creating a generator rotary speed corresponding to a generator frequency,
control of the internal combustion engine such that the generator frequency is in a tolerance range, wherein a grid frequency is within the tolerance range,
detecting a phase angle difference between a current and/or a voltage generated by the generator and a grid current and/or a grid voltage,
synchronizing the voltage and/or the current with the grid voltage and/or the grid current to reduce as phase angle difference ($\Delta\varphi$), and
electrically connecting the generator to a power supply grid,
wherein at least one temporary change in an ignition timing of at least one cylinder unit of the internal combustion engine is performed to reduce the phase angle difference ($\Delta\varphi$).

19 Claims, 2 Drawing Sheets

(51) Int. Cl.
   *F02D 41/00*     (2006.01)
   *F02P 5/15*      (2006.01)
(58) Field of Classification Search
   CPC ... F02D 41/062; F02P 5/00; F02P 5/15; H02J
              2203/10; H02J 3/44; H02P 9/04; H02P
                                                9/42
   See application file for complete search history.

(56)             References Cited

U.S. PATENT DOCUMENTS

| 10,273,926 | B2* | 4/2019  | Yamaguchi | F02D 41/061 |
| 2012/0175876 | A1* | 7/2012  | Pendray  | F02D 29/06 |
|            |     |         |          | 290/41 |
| 2016/0266559 | A1* | 9/2016  | Shi      | G05B 15/02 |
| 2018/0041153 | A1  | 2/2018  | Pendray et al. | |
| 2018/0252176 | A1* | 9/2018  | Oguguo   | F02B 37/00 |
| 2018/0287393 | A1* | 10/2018 | Maedako  | H02J 3/46 |
| 2018/0320642 | A1* | 11/2018 | Nakatani | F02P 5/152 |
| 2019/0323439 | A1* | 10/2019 | Attia    | H02K 7/1815 |

FOREIGN PATENT DOCUMENTS

| EP | 2651000 | A2 | 10/2013 |
| EP | 2433355 | B2 | 10/2017 |
| EP | 3561988 | A1 | 10/2019 |
| WO | 2017051156 | A1 | 3/2017 |

OTHER PUBLICATIONS

German Office Action of Application No. DE 10 2021 105 547.4, dated Jan. 24, 2022; 6 pages.

* cited by examiner

METHOD OF SYNCHRONIZING A GENERATOR WITH A POWER SUPPLY NETWORK

CROSS-REFERENCE TO RELATED APPLICATION

This application claims priority from and claims benefit of German Patent Application No. DE 10 2021 105 547.4, filed on Mar. 8, 2021; entitled "METHOD OF SYNCHRONIZING A GENERATOR WITH A POWER SUPPLY NETWORK", which is herein incorporated by reference in its entirety.

BACKGROUND

The present invention concerns a method of synchronizing a generator with a power supply grid having a grid frequency, having the features of a classifying portion, an internal combustion engine for driving a generator, a computer program product for synchronizing a generator with a power supply grid having a grid frequency, having the features of a classifying portion, and a computer-readable storage medium having such a computer program product.

Methods of the general kind set forth of synchronizing a generator with a power supply grid having a grid frequency include the following steps:
  mechanically driving the generator by means of an internal combustion engine, in particular a gas engine, creating a generator rotary speed corresponding to a generator frequency generated by the generator at the prevailing generator rotary speed,
  closed-loop or open-loop control of the internal combustion engine such that the generator frequency is in a tolerance range, wherein the grid frequency is within the tolerance range,
  detecting a phase angle difference between a current generated by the generator and/or a voltage generated by the generator on the one hand and a grid current and/or a grid voltage on the other hand,
  synchronizing the voltage generated by the generator and/or the current generated by the generator on the one hand with the grid voltage and/or the grid current on the other hand by the phase angle difference being reduced, in particular minimized, and
  electrically connecting the generator to the power supply grid.

To synchronize the generator with the power grid, it is known to be necessary for the generator speed firstly to be increased or reduced to a value corresponding to the current frequency and consequently also to suitably provide for closed-loop control thereto, wherein the phase position of the generator is to be brought substantially into conformity with that of the power grid.

That is to be found, for example, in EP 2 651 000 A2, wherein it is described that after the increase in the generator speed, there is a wait until the phase angle of the generator and the power supply grid coincide within certain limits, and then the generator is electrically connected to the power supply grid. That method involves a relatively high synchronization time.

EP 3 561 988 A1 describes a method with which the synchronization time can be reduced by either the fuel feed or the ignition being deliberately skipped for certain cylinder units. Specifically, in the case of mixture-charged internal combustion engines in which the mixture is already formed prior to the feed into a cylinder unit (and thus into the combustion chamber), skipping ignition when using for example natural gas as the fuel involves high levels of methane emission, which are emitted to the atmosphere in an unburnt state by way of the exhaust system.

In addition, upon an emission of unburnt fuel-air mixtures by way of the exhaust system (the exhaust system is generally at high temperatures), this results in low speed detonation (or also referred to as misfires), which can result in considerable noise pollution, damage and unwanted emissions.

BRIEF DESCRIPTION

Therefore, the object of the present invention is to provide a method of synchronizing a generator with a power supply grid, which at least partially improves the above-mentioned disadvantages in the state of the art and/or shortens a synchronization time between generator and power supply grid and/or reduces the emissions during synchronization and/or provides a resources-conserving method for synchronization.

Embodiments of the invention include a method of synchronizing a generator with a power supply grid having a grid frequency as set forth by the features described and claimed below, an internal combustion engine having the features described and claimed below, a computer program product having the features described and claimed below, and a computer-readable storage medium having such a computer program product.

According to an embodiment of the invention, it is provided that a method of synchronizing a generator with a power supply grid having a grid frequency includes the following steps:
  a) mechanically driving the generator by means of an internal combustion engine, in particular a gas engine, creating a generator rotary speed corresponding to a generator frequency generated by the generator at the prevailing generator rotary speed,
  b) closed-loop or open-loop control of the internal combustion engine, such that the generator frequency is in a tolerance range, wherein the grid frequency is within the tolerance range,
  c) detecting a phase angle difference between a current generated by the generator and/or a voltage generated by the generator on the one hand, and a grid current and/or a grid voltage on the other hand,
  d) synchronizing the voltage generated by the generator and/or the current generated by the generator on the one hand with the grid voltage and/or the grid current on the other hand by the phase angle difference being reduced, in particular minimized, and
  e) electrically connecting the generator to the power supply grid, wherein the reduction in the phase angle difference is achieved by at least one temporary change in an ignition timing of at least one cylinder unit of the internal combustion engine.

The temporary change according to the foregoing embodiment of the invention in the ignition timing of at least one cylinder unit of the internal combustion engine provides that a power output or an internal combustion engine speed can be changed over very short periods of time with a high level of precision, so that the phase angle difference can be reduced without changing the rotary speed to such an extent that the generator frequency would leave the tolerance range. Nonetheless, at the same time, complete combustion in the at least one cylinder unit of the supplied fuel-air mixture can take place, whereby there are no significant increases in the expelled emissions from the internal combustion engine.

It will be appreciated that, in accordance with an embodiment of the invention, it can nonetheless additionally be provided that a change in the ignition timing is used in order also to adapt a rotary speed of the internal combustion engine.

In addition, this procedure avoids misfires or low speed detonations in the exhaust tract of the internal combustion engine as the unburnt fuel-air mixtures no longer pass into same.

By virtue of the temporary—preferably intermittent—adjustment of the ignition timing, it is nonetheless possible to effect a very fast and uncomplicated change in the phase angle difference, which permits very rapid synchronization between a generator and a power supply grid in order to electrically connect the generator to the power supply grid.

Particularly, when using stationary internal combustion engines for electrical energy generation and feed into a power supply grid, a significant advantage is that these stationary internal combustion engines can be very quickly ramped up and can be coupled to the power supply grid in order to be able to stabilize suddenly occurring instabilities in the power supply grid (caused for example by the dips of a power supply of an alternative energy source—photovoltaic installation) in order to be able to avoid possible power supply grid collapses.

Particularly, having regard to the increasing number of alternative energy sources, it is becoming more and more necessary to take stabilization measures for a power supply grid (as alternative energy sources like, for example, photovoltaic installations can create massive energy fluctuations in a power supply grid by the sun being blocked by clouds).

In order to be able to stabilize these fluctuations in the power supply grid and to be able to prevent a possible dip of the power supply grid, it is necessary to be able to replace these dips on the part of the alternative energy sources by alternatives in a short time and for a short period, whereby it is of high priority to be able to connect corresponding energy sources to a power supply grid as quickly as possible, as is allowed by the present invention with nonetheless acceptable conditions in respect of emissions, energy expenditure, and environment.

Corresponding electrical energy supply systems are also referred to as gensets, wherein a stationary internal combustion engine—preferably a gas engine—drives a generator, which can be electrically connected to a power supply grid.

A method, according to an embodiment of the invention, can also find application in already known variants of the state of the art as described, for example, in the preamble to this description, and can be subsequently installed.

In a particularly preferred embodiment of the invention, the reduction in the phase angle difference can be achieved primarily exclusively by the temporary change according to the invention in the ignition timing of at least one cylinder unit of the internal combustion engine. Secondary changes for maintaining the rotary speed in the tolerance range (for example, slight opening of the throttle valve) are naturally optionally nonetheless to be implemented.

The temporary change in the ignition timing can be effected for all cylinders of the internal combustion engine, for individual cylinders, or for groups of cylinders. It is particularly preferably provided that the temporary change in the ignition timing is effected for all cylinders of the internal combustion engine.

To connect the generator to the power supply grid, it can be provided that a connection criterion has to be met. Such a connection criterion can include, for example, the generator rotary speed being within a predeterminable tolerance range and the phase angle difference being in a predeterminable further tolerance range.

The term power supply grid can be used to denote a public electrical short-distance or long-distance grid system, but also applications in which an energy supply for one or a few consumers is formed by one or a few generators (this is often also referred to as a stand-alone supply).

Advantageous embodiments of the invention are defined by means of the appendant claims.

It can preferably be provided that the at least one temporary change in the ignition timing ($t_{temp}$) is effected in accordance with a switching rule (S), wherein the switching rule (S) is a function:

$$S=f(\Delta n_{gsetpoint},\Delta\varphi)$$

of a deviation relative to the setpoint generator rotary speed ($\Delta n_{gsetpointl}$) and the phase angle difference ($\Delta\varphi$).

It can be provided, for example, that the switching rule (S) is met (S=0) if the rotary speed is in a predeterminable tolerance range and the phase angle difference is in a further predeterminable tolerance range.

It can be provided that the temporary change in the ignition timing is effected at the condition S>ε, wherein S=ε if $\Delta n_{gsetpointl}$=0. ε can be selected for example to be zero (=0).

This means that it can be provided that the temporary change in the ignition timing is effected at the condition S>0, wherein particularly preferably at S>0 the ignition timing is adjusted to late or early in order to reduce the rotary speed of the internal combustion engine and/or it can be provided that a temporary change in the ignition timing at the condition S<0 is set back to the nominal ignition timing in order to increase the rotary speed of the internal combustion engine.

It is preferably provided that the temporary change in the ignition timing occurs relative to a predeterminable nominal ignition timing.

It can be provided that the ignition timing is temporarily changed relative to the predeterminable nominal ignition timing. This means it can be provided that the nominal ignition timing is temporarily set to "late" or "early".

It is preferably provided that in step d) a switch is made from the nominal ignition timing to the later or early changed ignition timing and vice-versa.

This means it can be provided that the ignition timing is switched to late or early for a short period, and is then switched back to the nominal ignition timing in order to adapt the phase angle difference scrupulously precisely. That procedure can be repeated as often until the phase angle difference is acceptably reduced—in particular minimized. In other words, the ignition timing can be intermittently changed from the nominal ignition timing to the changed ignition timing.

It can be provided that the ignition timing is abruptly changed through 15 to 20° crank angle (° CA).

Depending on the rotary speed and phase angle performance, the foregoing state (change in the ignition timing) can be held up to ~2 s.

If the rotary speed and phase angle difference are in a range which would allow synchronization, the ignition timing is constantly abruptly changed (either nominal ignition timing or changed ignition timing), wherein a switching state is held for usually less than 0.2 s before it is switched over again (to the nominal ignition timing $t_{nom}$).

In that way, the rotary speed and phase angle difference can be held in the synchronization window until the generator switch closes. Usually, that entire procedure of synchronization (from activation of the controller) can last for 2 to 3 s (that is to say, during that time the ignition timing can be constantly abruptly changed). Preferably, the procedure can be active at a maximum for 15 s.

It can be provided that the temporary change in the ignition timing is effected substantially in discrete steps.

It is preferably provided that a throttle valve of the internal combustion engine, in particular a gas engine, is subjected to open-loop and/or closed-loop control in such a way that the generator rotary speed increases during the step d) if the ignition timing would remain substantially at the predeterminable nominal ignition timing.

Expressed in simplified form, this means that the throttle valve can be slightly opened when reducing the phase angle difference.

It can be provided that the temporary change in the ignition timing is terminated with the connection of the generator to the power supply grid.

In addition, protection is claimed for an internal combustion engine, in particular a gas engine, including at least one cylinder unit and an open-loop and/or closed-loop control unit, wherein the open-loop and/or closed-loop control unit is adapted to provide for open-loop or closed-loop control of the internal combustion engine according to the method according to the invention.

In regard to a computer program product according to the invention for synchronizing a generator with a power supply grid having a grid frequency, there are provided commands which cause an executing computer:

a) to actuate an internal combustion engine, in particular a gas engine, for mechanically driving the generator with the creation of a generator rotary speed, wherein the generator rotary speed corresponds to a generator frequency generated by the generator at the present generator rotary speed, b) to provide for closed-loop or open-loop control of the internal combustion engine such that the generator frequency is in a tolerance range, wherein the grid frequency is within the tolerance range, c) to receive or calculate at least one detection signal, which detection signal corresponds to a phase angle difference between a current generated by the generator and/or a voltage generated by the generator on the one hand and a grid current and/or a grid voltage on the other hand, d) to actuate the internal combustion engine for synchronizing the voltage generated by the generator and/or the current generated by the generator on the one hand with the grid voltage and/or the grid current on the other hand by the phase angle difference ($\Delta\varphi$) being reduced, in particular minimized, and e) to output a trigger signal for electrically connecting the generator to the power supply grid, wherein the commands cause the computer to reduce the phase angle difference by at least one temporary change in an ignition timing of at least one cylinder unit of the internal combustion engine.

Protection is also claimed for a computer-readable storage medium with a computer program product according to the invention.

BRIEF DESCRIPTION OF THE DRAWINGS

Further particularities, advantages and details of the present invention are described by way of example by means of the specific description hereinafter with reference to the Figures in which.

DETAILED DESCRIPTION

Figure 1:
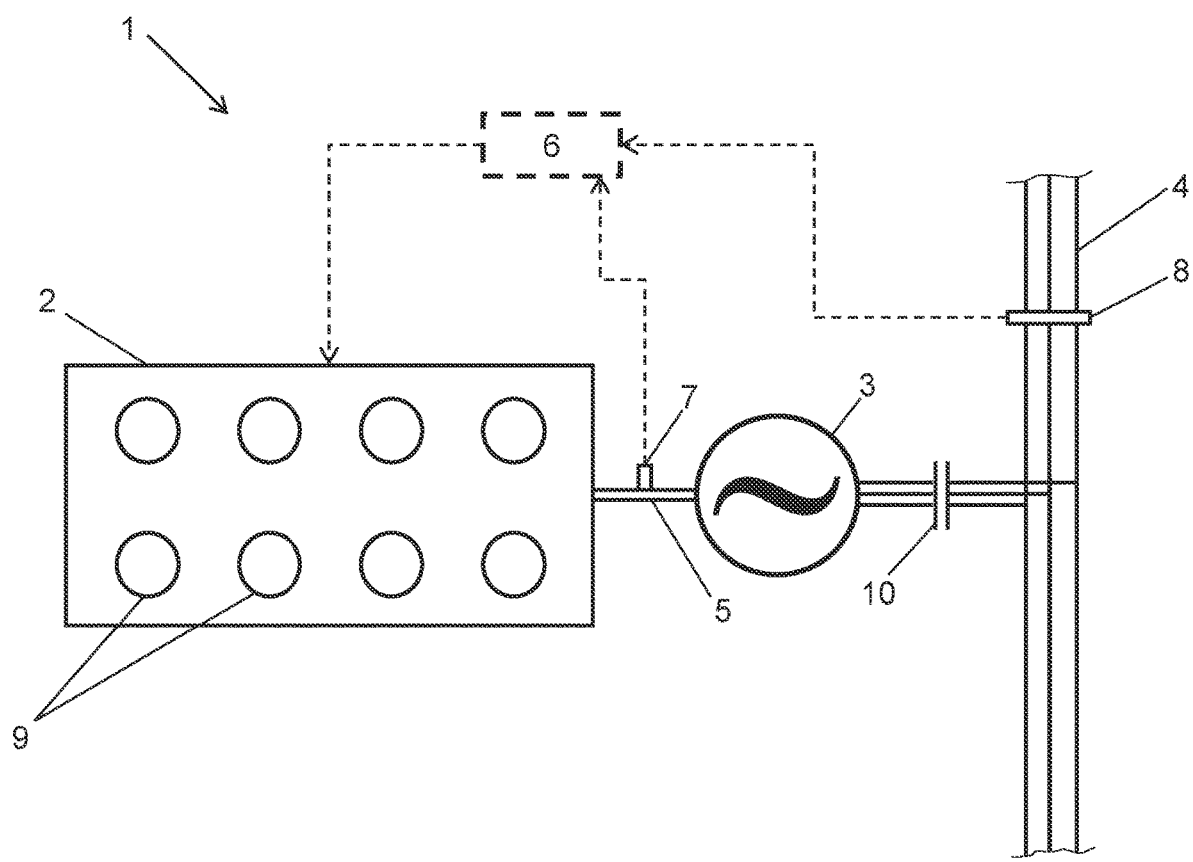
FIG. 1 shows a first embodiment of a genset.

FIG. 1 shows a first embodiment of a genset 1.

The genset 1 includes an internal combustion engine 2, which is connected to a generator 3 for power generation by way of a mechanical shaft 5 (for example, this can also be implemented in the form of a prolongation of the crankshaft of the internal combustion engine 2).

In addition, in principle, a transmission could also be provided between the crankshaft of the internal combustion engine.

In this embodiment, the internal combustion engine 2 has a plurality of cylinder units 9, wherein the cylinder units 9 can be subjected to open-loop or closed-loop control by way of a central open-loop or closed-loop control unit 6 during operation of the internal combustion engine 2, by for example the ignition, the fuel feed, the air feed and/or other parameters of combustion being subjected to open-loop or closed-loop control by suitable valves, open-loop or closed-loop control members, by means of the open-loop or closed-loop control unit 6.

The generator 3 can be connected to a power supply grid 4 by way of an electrical connection 10, wherein the electrical connection 10 can be in the form of a switch connecting the electric lines of the generator 3 to the power supply grid 4.

In addition, there is provided a first sensor 7 to be able to ascertain a characteristic parameter for the generated voltage or the generated current of the generator 3. A frequency of the voltage and/or the current of the generator 3 can be ascertained by means of that characteristic parameter of the generated voltage or the current of the generator 3 by way of the open-loop or closed-loop control unit 6.

In this embodiment, the first sensor 7 is in the form of a rotary speed sensor at the shaft 5, the measured rotary speed in this embodiment corresponding to the generator rotary speed of the generator 3. If there were a transmission, then the generator rotary speed could be ascertained on the basis of a known transmission ratio. A frequency of the current generated by the generator 3 and the voltage of the generator 3 is known by the known generator rotary speed.

In addition, this embodiment shows a second sensor 8, by means of which a frequency of the current and/or the voltage of the power supply grid 4 can be ascertained and can be fed to the open-loop or closed-loop control unit 6.

It can further be provided that the open-loop or closed-loop control unit 6 is connected to the electrical connection 10, wherein the electrical connection 10 between the generator 3 and the power supply grid 4 can be created and/or interrupted by the open-loop or closed-loop control unit 6.

Thus, by way of the open-loop or closed-loop control unit 6, it can be provided that as required the internal combustion engine 2 is started to drive the generator 3.

The rotary speed of the internal combustion engine 2 and therewith the generator frequency can be subjected to open-loop or closed-loop control by way of the open-loop or closed-loop control unit 6 in such a way that the generator frequency approaches the grid frequency until the generator frequency is in the tolerance range 12 around the grid frequency.

There is then a phase angle difference between the grid voltage and/or the grid current on the one hand and the generator voltage and/or the generator current on the other hand. In order to be able to couple the generator to the power supply grid 4 to deliver electrical energy, the phase angle difference generally now has to be reduced, in particular minimized (this is also referred to as synchronization of the generator 3 with the power supply grid 4).

According to an embodiment of the invention, that is effected by changing the ignition timing of at least one cylinder unit 9 of the internal combustion engine 2.

Figure 2A:
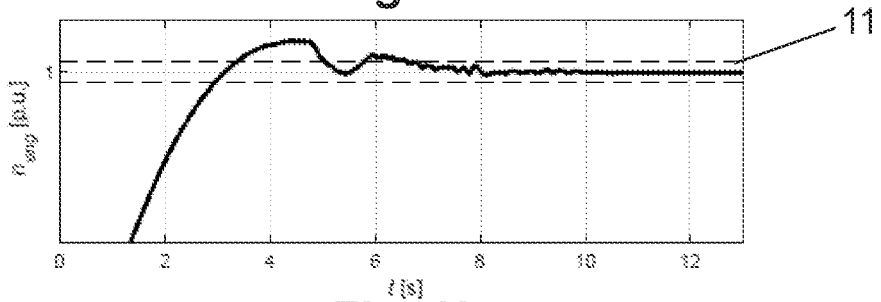
FIGS. 2a-2e show measurements and actuating signals for carrying out an embodiment of a method according to the invention.

Measurement values and actuation signals from a method, according to an embodiment of the invention, for synchronizing the generator 3 to the power supply grid 4 are shown by FIGS. 2a through 2e, wherein (as shown in FIG. 2a) an internal combustion engine 2 with a coupled generator 3 is accelerated from the stopped condition until a desired generator rotary speed is reached.

In that respect, FIG. 2a shows the behavior of the generator rotary speed along the synchronization time with the power supply grid 4.

Figure 2B:
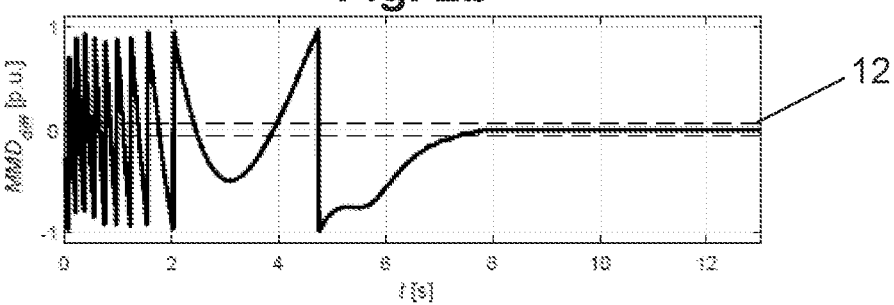

FIG. 2b shows a phase angle difference in respect of the current and/or the voltage between the generated current and/or voltage of the generator 3 and the current and/or voltage of the power supply grid 4.

Figure 2C:
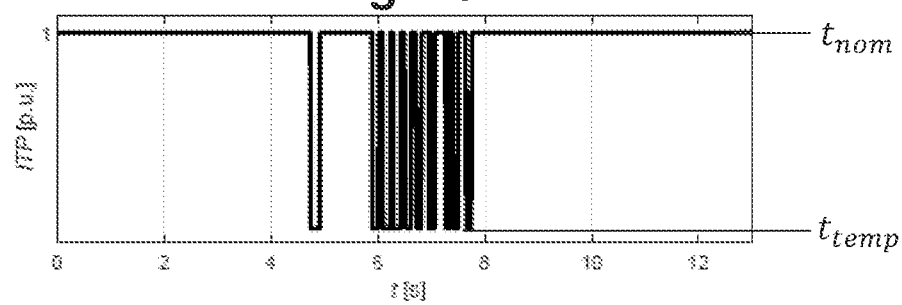

FIG. 2c shows a control signal of the open-loop or closed-loop control unit 6 for the ignition timing of at least one cylinder unit 9 of the internal combustion engine 2, that is to say a control signal for determining the ignition timing. That ignition timing is specified in this Figure with respect to an angle of revolution of the crankshaft of the internal combustion engine 2 before a top dead center point (as is customary in the state of the art).

Figure 2D:
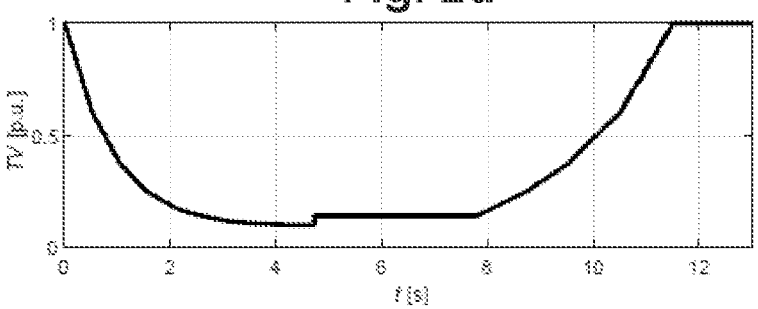

FIG. 2d shows an open-loop or closed-loop control signal of the open-loop or closed-loop control unit 6 with respect to a throttle valve of the internal combustion engine 2, wherein the graph shows an opening of the throttle valve between "1" (fully opened) and "0" (fully closed).

Figure 2E:
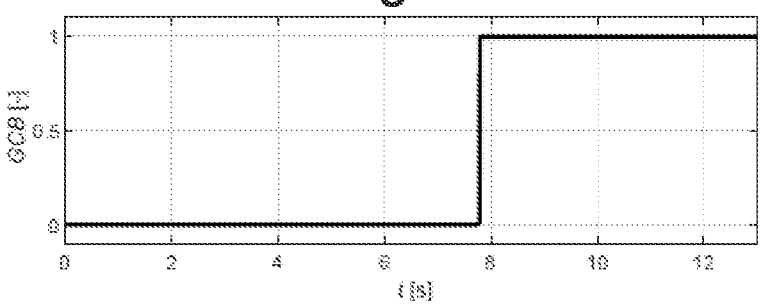

FIG. 2e shows an open-loop or closed-loop control signal of the open-loop or closed-loop control unit 6 for the electrical connection 10 of the generator 3 to the power supply grid 4, wherein a distinction is drawn between a closed connection "1" (control signal for closure of the electrical connection 10) and an opened connection "0". As can be seen, the connection 10 of the generator 3 to the power supply grid 4 is made as soon as the phase angle difference is stabilized in a further tolerance range 12 for an acceptable phase angle difference (connection criterion).

Those measurement values or actuation signals were gathered simultaneously during the implementation of the embodiment of a method according to the invention on an internal combustion engine 2, the time scale in FIGS. 2a through 2e being the same.

Thus, it can be seen that firstly the internal combustion engine 2 is started up until it exceeds a desired generator rotary speed, wherein firstly the throttle valve is fully opened for acceleration of the internal combustion engine 2 as rapidly as possible.

In order slowly to slow down the acceleration, the throttle valve is closed shortly before reaching the desired rotary speed and the acceleration is reduced and, vice-versa, in order to move into the desired tolerance range 11 of the rotary speed (or equivalent the generator frequency). Before that hunting of the phase angle difference (FIG. 2b) is to be observed, which naturally is to be attributed to the non-coincidence of the generator frequency with the grid frequency.

It can be seen from FIG. 2c that synchronization begins at about second 10, by the nominal ignition timing $t_{nom}$ of a cylinder unit being shifted towards "late" becoming a changed ignition timing $t_{temp}$, and that is reset after each cycle or after a predeterminable number of cylces in order to bring the rotary speed of the internal combustion engine (as shown in FIG. 2a) and, thus, also the generator rotary speed, into a predetermined rotary speed band in respect of which a phase angle difference between power supply grid 4 and generator 3 is minimized (or more optimally is eliminated).

It can further be seen from FIG. 2d that the throttle valve is slightly opened at the beginning of synchronization. That opening makes it possible to increase the rotary speed of the internal combustion engine 2 when the ignition timing corresponds to the nominal ignition timing $t_{nom}$ and to reduce the rotary speed when the ignition timing corresponds to the changed ignition timing $t_{temp}$. In that way, it is possible to achieve a better response characteristic in respect of closed-loop control during synchronization.

As soon as the phase angle difference has been minimized to such an extent that it corresponds to a connection criterion, the generator 3 is connected to the power supply grid 4 by way of the electrical connection 10 by the open-loop or closed-loop control unit 6 and can be changed into a normal operating mode for the genset 1 by the open-loop or closed-loop control unit 6.

The connection criterion includes, for example, that the generator rotary speed (see FIG. 2a) is in a predeterminable tolerance range 11 and that the phase angle difference (see FIG. 2a) is in a predeterminable further tolerance range 12.

The throttle valve is then constantly opened after the generator 3 has been connected to the power supply grid 4 in order to increase the power output of the internal combustion engine 2 and thus the power delivered to the power supply grid 4.

LIST OF REFERENCES

1 genset
2 internal combustion engine
3 generator
4 power supply grid
5 shaft
6 open-loop or closed-loop control unit
7 first sensor
8 second sensor
9 cylinder unit
10 electrical connection
11 tolerance range
12 tolerance range
$t_{nom}$ nominal ignition timing
$t_{temp}$ changed ignition timing

The invention claimed is:

1. A method of synchronizing a generator with a power supply grid having a grid frequency, including:
    mechanically driving the generator with an internal combustion engine, creating a generator rotary speed corresponding to a generator frequency generated by the generator,
    control of the internal combustion engine such that the generator frequency is in a tolerance range, wherein the grid frequency is within the tolerance range, detecting a phase angle difference (Δφ) between a current and/or a voltage generated by the generator and a grid current and/or a grid voltage to obtain a detected phase angle difference (Δφ), synchronizing the voltage and/or the current with the grid voltage and/or the grid current based on the detected phase angle difference (Δφ), wherein synchronizing comprises controlling at least one temporary change in one or more parameters to reduce the phase angle difference (Δφ), and the at least one temporary change in the one or more parameters comprises at least one temporary change in an ignition timing ($t_{temp}$) relative to a predetermined nominal ignition timing ($t_{nom}$) of at least one cylinder unit of the internal combustion engine, wherein synchronizing comprises repeatedly switching from the predetermined nominal ignition timing ($t_{nom}$) to the ignition timing ($t_{temp}$) and vice-versa a plurality of times until the phase angle difference (Δφ) is reduced to meet a phase angle tolerance range, wherein the plurality of times of the switching comprises at least five times, wherein the switching holds the ignition timing ($t_{temp}$) for less than 0.2 seconds for each of the plurality of times, and electrically connecting the generator to the power supply grid.

2. The method of claim 1, wherein the at least one temporary change in the ignition timing is effected in accordance with a switching rule (S) based on the detected phase angle difference (Δφ), wherein the switching rule (S) is a function:

$$S=f(\Delta n_{gsetpoint1}, \Delta\varphi)$$

of a deviation relative to a setpoint generator rotary speed ($\Delta n_{gsetpoint1}$) and the detected phase angle difference (Δφ).

3. The method of claim 2, wherein the at least one temporary change in the ignition timing is effected at the condition S>ε wherein S=ε if $\Delta n_{gsetpoint1}=\Delta\varphi=0$.

4. The method of claim 1, wherein the plurality of times of the switching comprises at least ten times.

5. The method of claim 1, wherein the switching occurs for the plurality of times over a time duration of up to 15 seconds.

6. The method of claim 1, wherein the switching occurs for the plurality of times over a time duration of up to 3 seconds.

7. The method of claim 1, wherein the at least one temporary change in the ignition timing is effected substantially in discrete steps.

8. The method of claim 1, wherein the at least one temporary change in one or more parameters comprises a temporary change in a position of a throttle valve of the internal combustion engine over a first period of time followed by the at least one temporary change in the ignition timing ($t_{temp}$) over a second period of time, wherein the temporary change in the position of the throttle valve over the first period of time increases the generator rotary speed to increase the generator frequency toward the tolerance range while the ignition timing remains substantially at the predetermined nominal ignition timing ($t_{nom}$), wherein the at least one temporary change in the ignition timing ($t_{temp}$) over the second period of time occurs after the temporary change in the position of the throttle valve increases the generator frequency toward the tolerance range, wherein the generator frequency is within the tolerance range and the phase angle difference (Δφ) is within the phase angle tolerance range at least partially during or by an end of the second period of time.

9. The method of claim 1, wherein the at least one temporary change in the ignition timing is terminated with the connection of the generator to the power supply grid.

10. A non-transitory computer readable medium comprising instructions that when executed cause a processor to:

actuate an internal combustion engine for mechanically driving a generator with a generator rotary speed corresponding to a generator frequency, control the internal combustion engine such that the generator frequency is in a tolerance range, wherein a grid frequency of a power supply grid is within the tolerance range, receive or calculate at least one detection signal corresponding to a phase angle difference (Δφ) between a current and/or a voltage generated by the generator and a grid current and/or a grid voltage to obtain a detected phase angle difference (Δφ), actuate at least one temporary change in one or more parameters of the internal combustion engine, based on the detected phase angle difference (Δφ), for synchronizing the voltage and/or the current with the grid voltage and/or the grid current to reduce the phase angle difference (Δφ), and the at least one temporary change in the one or more parameters comprises at least one temporary change in an ignition timing ($t_{temp}$) relative to a predetermined nominal ignition timing ($t_{nom}$) of at least one cylinder unit of the internal combustion engine, wherein synchronizing comprises repeatedly switching from the predetermined nominal ignition timing ($t_{nom}$) to the ignition timing ($t_{temp}$) and vice-versa a plurality of times until the phase angle difference (Δφ) is reduced to meet a phase angle tolerance range, wherein the plurality of times of the switching comprises at least five times, wherein the switching holds the ignition timing ($t_{temp}$) for less than 0.2 seconds for each of the plurality of times, and output a trigger signal for electrically connecting the generator to the power supply grid.

11. The non-transitory computer readable medium of claim 10, wherein the at least one temporary change in the ignition timing is effected in accordance with a switching rule (S) based on the detected phase angle difference (Δφ), wherein the switching rule (S) is a function:

$$S=f(\Delta n_{gsetpoint1}, \Delta\varphi)$$

of a deviation relative to a setpoint generator rotary speed ($\Delta n_{gsetpoint1}$) and the detected phase angle difference (Δφ).

12. The non-transitory computer readable medium of claim 11, wherein the at least one temporary change in the ignition timing is effected at the condition S>ε wherein S=ε if $\Delta n_{gsetpoint1}=\Delta\varphi=0$.

13. The non-transitory computer readable medium of claim 10, wherein the switching occurs for the plurality of times over a time duration of up to 3 seconds.

14. The non-transitory computer readable medium of claim 13, wherein the switching occurs for the plurality of times over a time duration of between 2 to 3 seconds.

15. The non-transitory computer readable medium of claim 10, wherein the plurality of times of the switching comprises at least ten times, and the switching occurs for the plurality of times over a time duration of up to 15 seconds.

16. The non-transitory computer readable medium of claim 10, wherein the at least one temporary change in one or more parameters comprises a temporary change in a position of a throttle valve of the internal combustion engine over a first period of time followed by the at least one temporary change in the ignition timing ($t_{temp}$) over a second period of time, wherein the temporary change in the position of the throttle valve over the first period of time increases the generator rotary speed to increase the generator frequency toward the tolerance range while the ignition timing remains substantially at the predetermined nominal ignition timing ($t_{nom}$), wherein the at least one temporary change in the ignition timing ($t_{temp}$) over the second period of time occurs after the temporary change in the position of the throttle valve increases the generator frequency toward the tolerance range, wherein the generator frequency is within the tolerance range and the phase angle difference ($\Delta\varphi$) is within the phase angle tolerance range at least partially during or by an end of the second period of time.

17. The non-transitory computer readable medium of claim 10, comprising a controller having the instructions, the internal combustion engine having the controller, or a combination thereof.

18. A system, comprising:
an internal combustion engine;
a generator configured to be driven by the internal combustion engine at a generator rotary speed corresponding to a generator frequency; and
a controller configured to:
control the internal combustion engine to adjust the generator frequency in a tolerance range, wherein a grid frequency of a power supply grid is within the tolerance range;
determine a phase angle difference ($\Delta\varphi$) between a current and/or a voltage generated by the generator and a grid current and/or a grid voltage of the power supply grid to obtain a detected phase angle difference ($\Delta\varphi$);
synchronize the voltage and/or the current with the grid voltage and/or the grid current based on the detected phase angle difference ($\Delta\varphi$) by control of at least one temporary change in one or more parameters to reduce the phase angle difference ($\Delta\varphi$), and the at least one temporary change in the one or more parameters comprises at least one temporary change in an ignition timing ($t_{temp}$) relative to a predetermined nominal ignition timing ($t_{nom}$) of at least one cylinder unit of the internal combustion engine wherein the controller is configured to synchronize by repeatedly switching from the predetermined nominal ignition timing ($t_{nom}$) to the ignition timing ($t_{temp}$) and vice-versa a plurality of times until the phase angle difference ($\Delta\varphi$) is reduced to meet a phase angle tolerance range, wherein the plurality of times of the switching comprises at least five times, wherein the switching holds the ignition timing ($t_{temp}$) for less than 0.2 seconds for each of the plurality of times; and
electrically connect the generator to the power supply grid.

19. The non-transitory computer readable medium of claim 10, wherein the at least one temporary change in the ignition timing ($t_{temp}$) is effected in accordance with a switching rule (S) based on the detected phase angle difference ($\Delta\varphi$), wherein the switching rule (S) is a function:

$$S=f(\Delta n_{gsetpointl}, \Delta\varphi)$$

of a deviation relative to the setpoint generator rotary speed ($\Delta n_{gsetpointl}$) and the detected phase angle difference ($\Delta\varphi$), wherein the at least one temporary change in the ignition timing ($t_{temp}$) is effected at the condition $S > \varepsilon$ wherein $S = \varepsilon$ if $\Delta n_{gsetpointl} = \Delta\varphi = 0$.

* * * * *